Jan. 25, 1966 A. W. HARRISON 3,231,052

LEVER ACTUATED, SPOT TYPE DISK BRAKE

Filed June 30, 1965 7 Sheets-Sheet 1

ANTHONY W. HARRISON
By: Scrivener & Parker

ANTHONY W. HARRISON
BY: Scrivener & Parker

ANTHONY W. HARRISON
BY: Scrivener & Parker

Jan. 25, 1966 A. W. HARRISON 3,231,052

LEVER ACTUATED, SPOT TYPE DISK BRAKE

Filed June 30, 1965 7 Sheets-Sheet 4

ANTHONY W. HARRISON

By: Scrivener & Parker

ANTHONY W. HARRISON
By: Scrivener & Parker

Jan. 25, 1966 A. W. HARRISON 3,231,052

LEVER ACTUATED, SPOT TYPE DISK BRAKE

Filed June 30, 1965 7 Sheets-Sheet 6

ANTHONY W. HARRISON
BY: Scrivener & Parker

Jan. 25, 1966 A. W. HARRISON 3,231,052

LEVER ACTUATED, SPOT TYPE DISK BRAKE

Filed June 30, 1965 7 Sheets-Sheet 7

ANTHONY W. HARRISON

BY: Scrivener & Parker

United States Patent Office
3,231,052
Patented Jan. 25, 1966

3,231,052

LEVER ACTUATED, SPOT TYPE DISK BRAKE

Anthony William Harrison, Birmingham, England, assignor to Girling Limited, Tyseley, Birmingham, England, a British company Filed June 30, 1965, Ser. No. 473,888
14 Claims. (Cl. 188—73)

This is a continuation-in-part of application Serial No. 225,717, filed September 24, 1962, and now abandoned.

This invention relates to improvements in disk brakes of the kind in which friction pads are arranged to be brought into engagement with opposite faces of a rotatable disk. An aim of the invention is to provide a disk brake of economical construction and reliable performance.

According to the invention there is now proposed a disk brake in which a friction pad arranged to be movable into engagement with one face of a rotatable disk is carried on a pressure member pivotally mounted on a stationary torque-taking block and a friction pad arranged to be brought into engagement with the opposite face of the disk is engaged by an intermediate point in a floating lever of which one end is engaged by force-applying means and the other is connected to the pressure member to bring the first-mentioned pad into engagement with the disk.

The second-mentioned pad is brought into engagement with the disk by the floating lever and the reaction of this causes the pivoted pressure member to bring the other pad into engagement with the opposite side of the disk. The torque reaction on the second-mentioned pad could be taken by mounting this pad on a link pivoted to a stationary member but this link will then only be serving to locate the pad and take the torque, and it does not form part of the force-applying linkage. Alternatively the second-mentioned pad could be guided in an opening in a stationary member, which could be a sheet metal plate lying with its plane parallel to that of the disk. The torque-taking block for the first-mentioned pad could be secured to this plate.

The invention will now be further described by way of example with reference to the accompanying drawings, in which.

Figure 1:
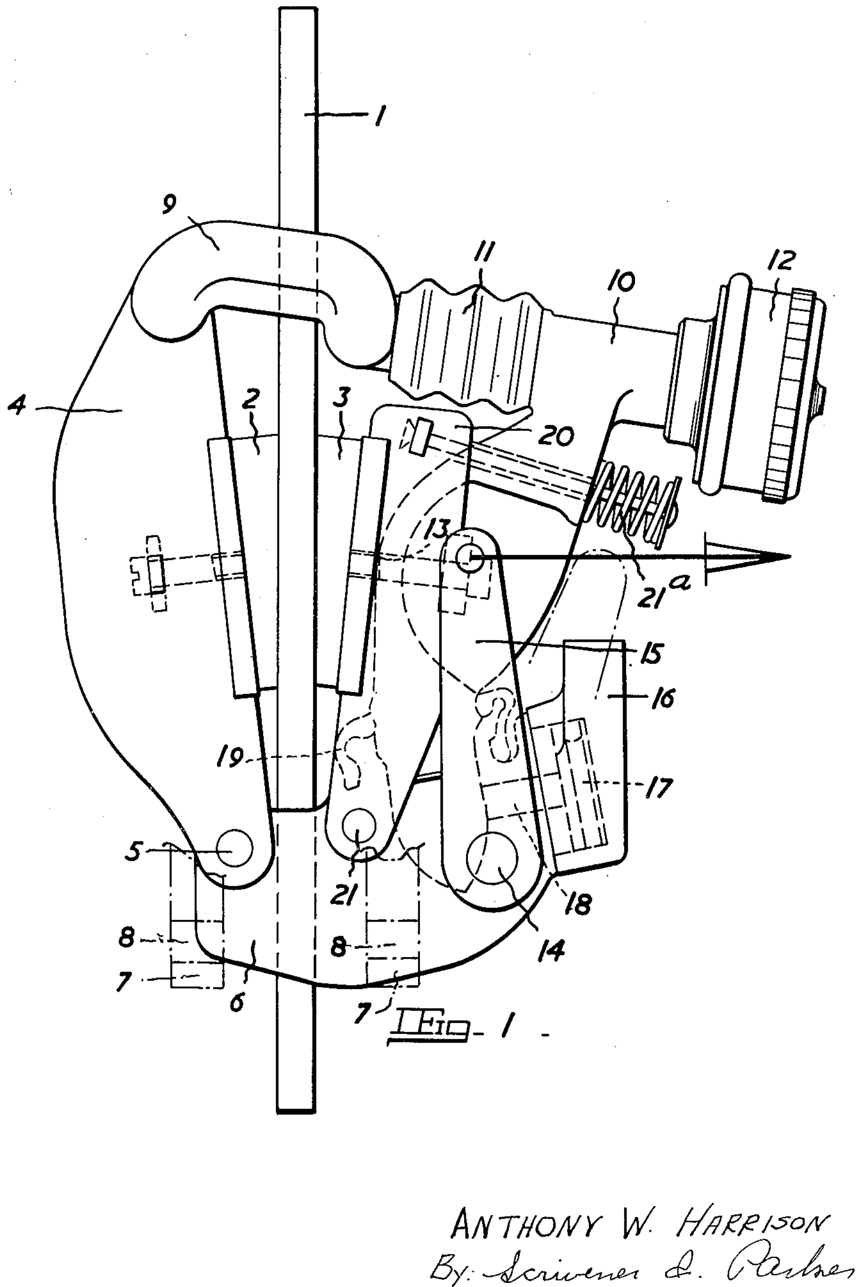
FIGURE 1 is an elevation of one form of brake according to the invention, looking in the plane of the disk.
Figures 2, 5:
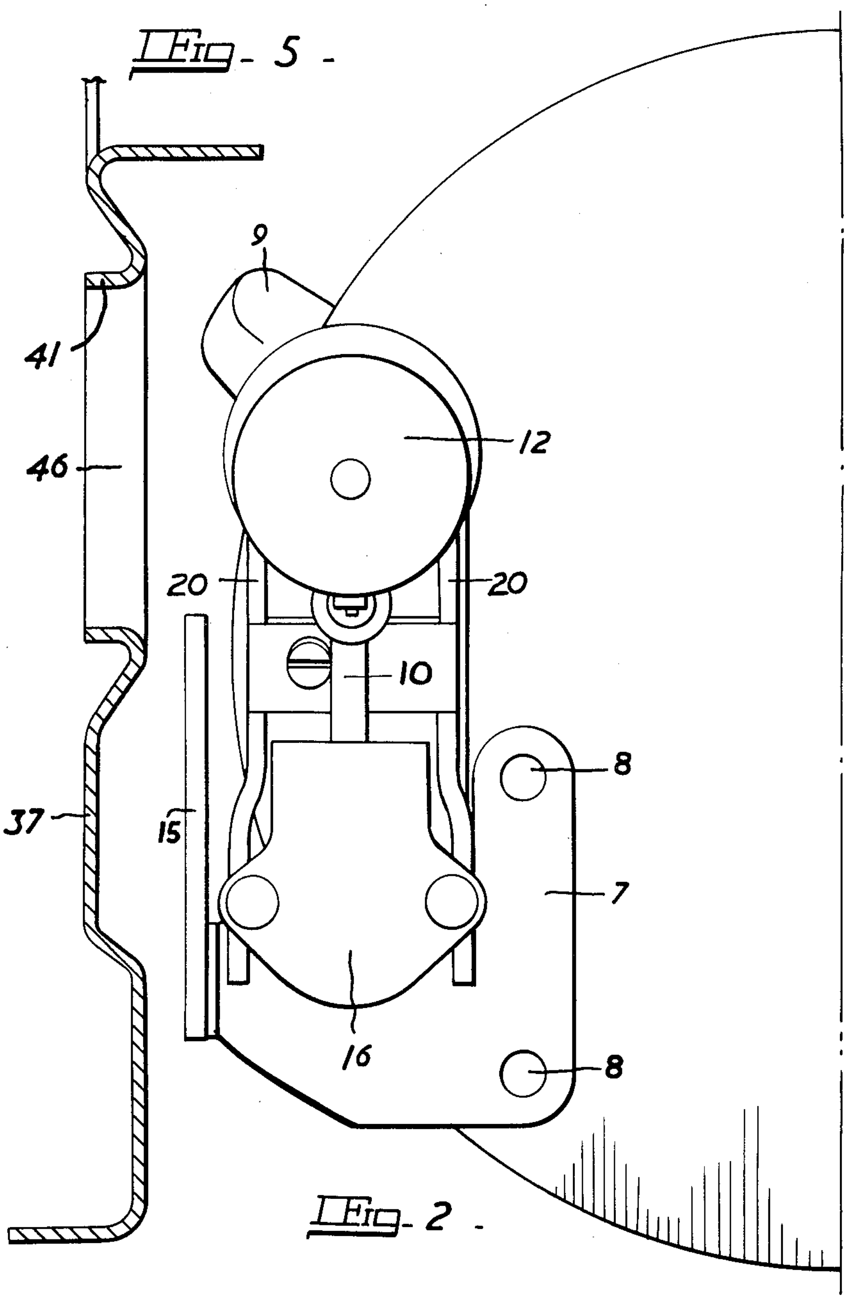
FIGURE 2 is an elevation of the brake of FIGURE 1, looking along the axis of the disk from the right in FIGURE 1.
Figure 3:
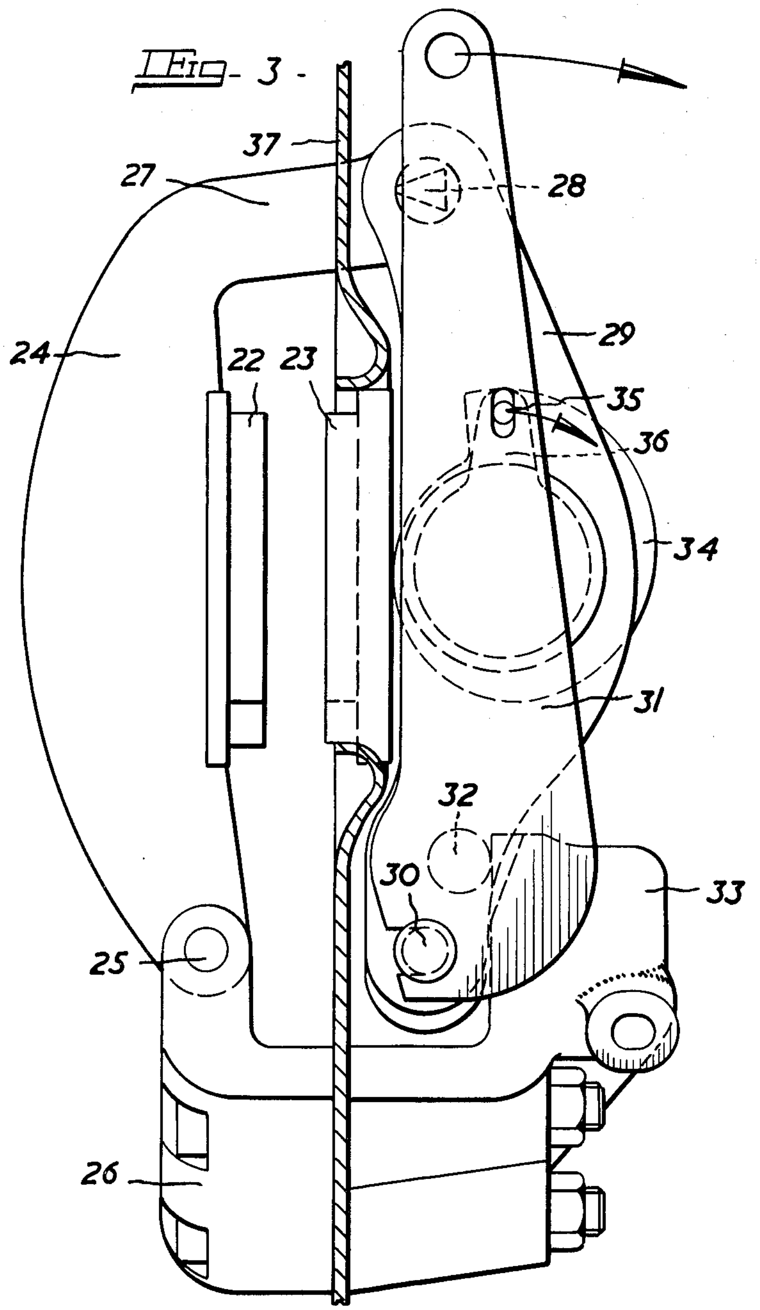
FIGURES 3 and 4 are views corresponding to FIGURES 1 and 2 but showing an alternative construction.
Figure 4:
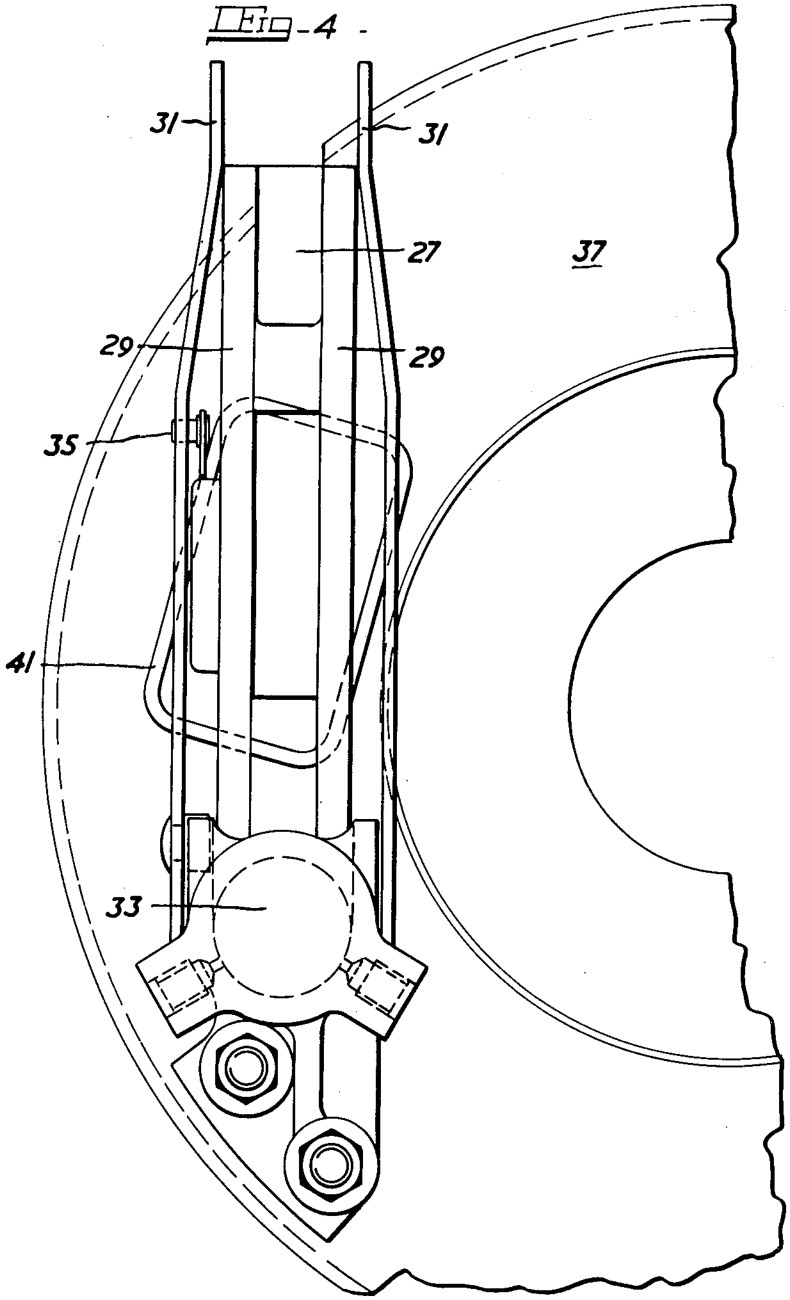
Figure 6:
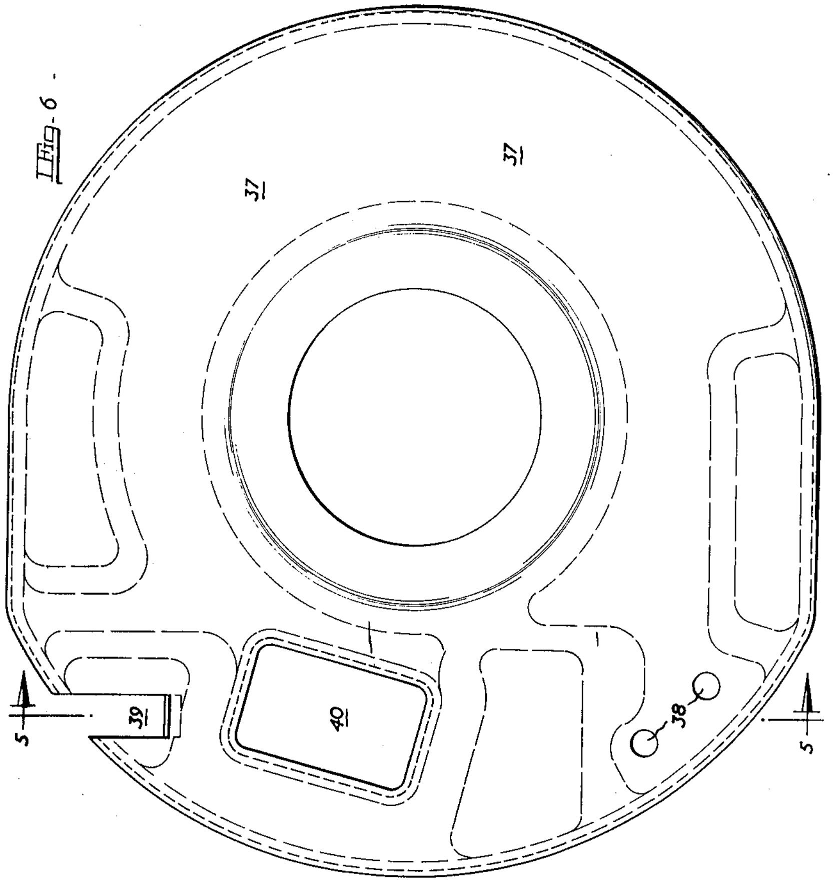
Figure 7:
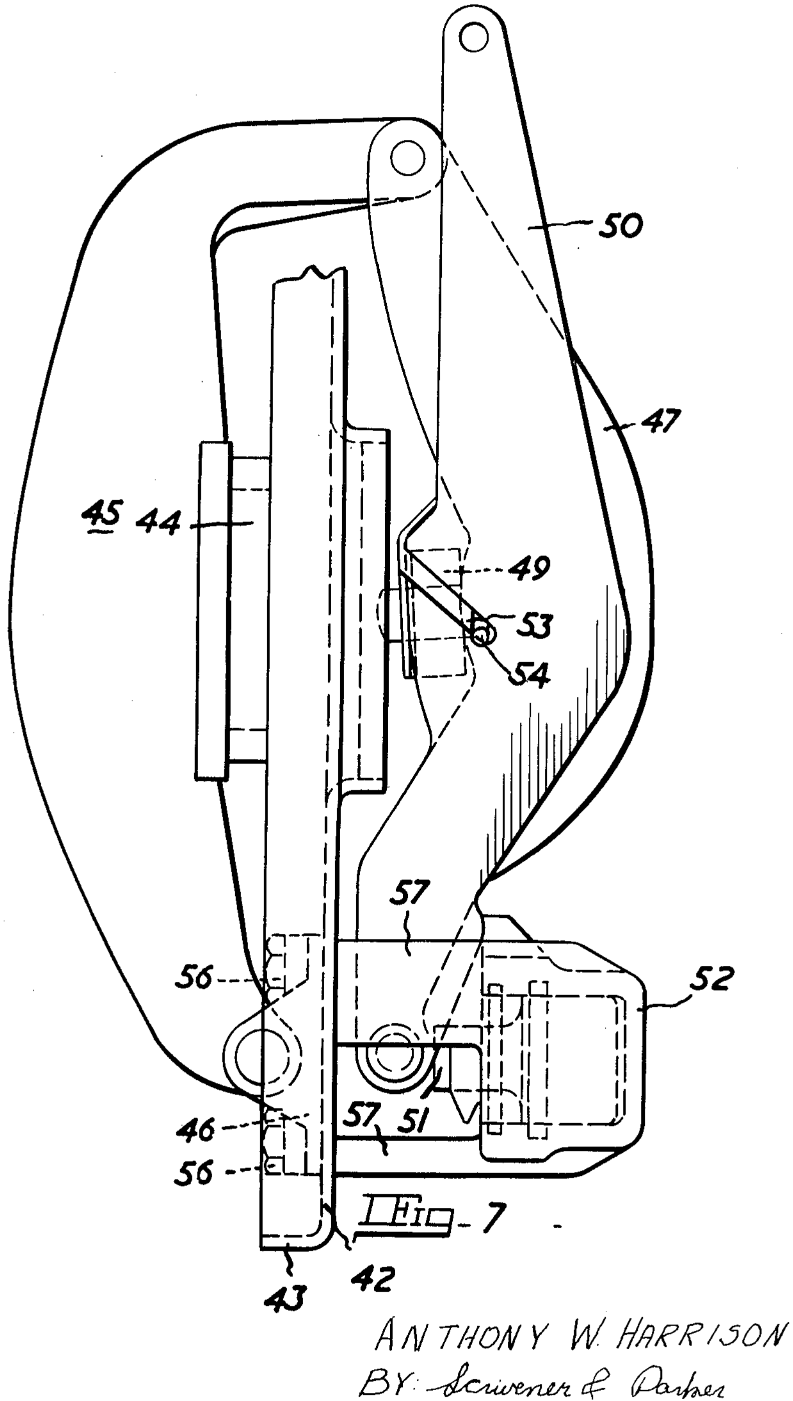
Figure 8:
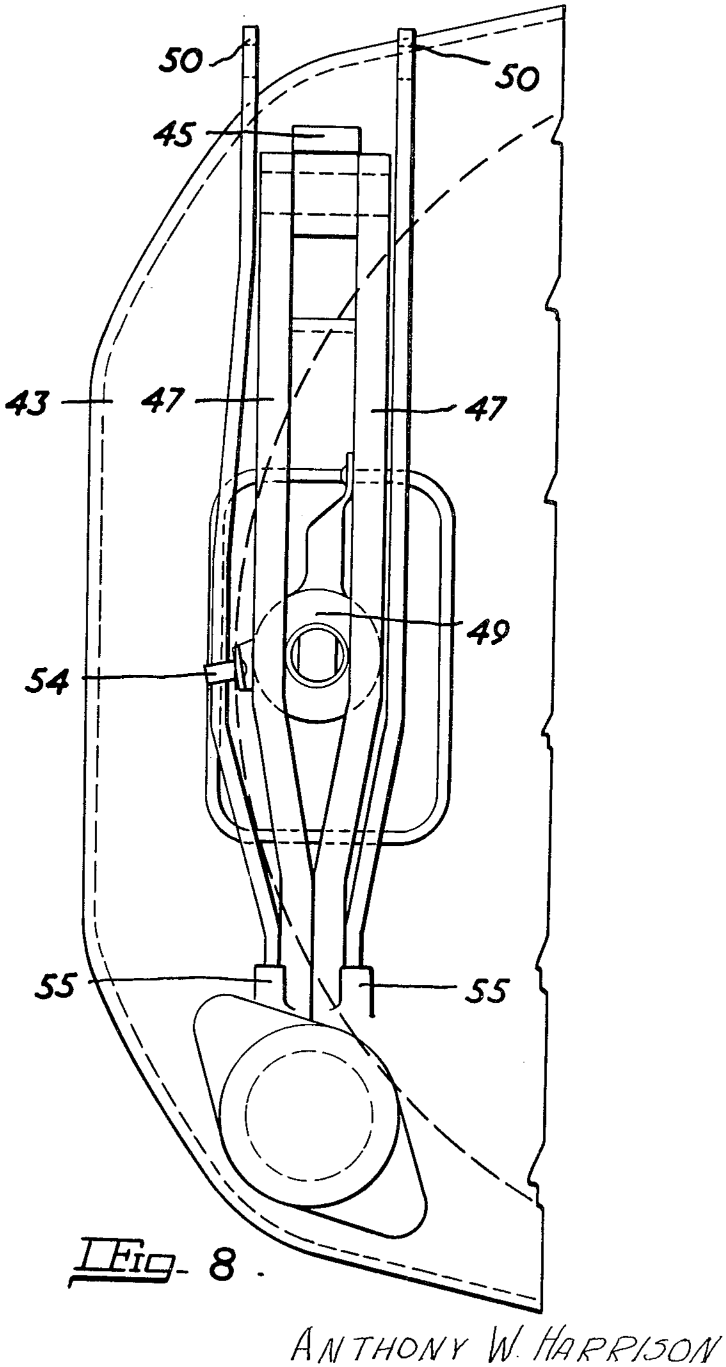

FIGURES 5 and 6 are an end and a side elevation of a torque-taking plate for the embodiment of FIGURES 3 and 4, FIGURE 5 being a section on the line 5—5 of FIGURE 6; and FIGURES 7 and 8 are views corresponding to FIGURES 1 and 2 showing a still further embodiment of the brake according to the invention.

Referring first to FIGURES 1 and 2 a rotatable disk 1 is engaged on opposite faces by friction pads 2 and 3. The pad 2 is secured to an intermediate point in the length of a lever or pressure member 4 which is pivoted at 5 to a stationary torque-taking block 6 that extends across the periphery of the disk. Plates 7 welded to the block 6 extend parallel to the plane of the disk and form, with the block 6, a horseshoe-shaped caliper which can be secured to a stationary part by bolts passing through holes 8.

Pivoted to the upper end of the pressure member 4 is a link 9 which extends across the plane of the disk just clear of its periphery. A floating lever 10 has on its upper end an adjusting screw which is not visible, being hidden by a protective sleeve 11, but which is pivoted to the other end of the link 9. The axial length of the adjusting device can be altered by means of a knurled head 12, which also incorporates an automatic adjuster that takes up any slack that develops in the linkage as the pads wear.

An intermediate point 13 in the floating lever 10 bears against the back of the backing plate of the second brake pad 3. The lower end of the lever is engaged by a flattened portion of a spindle 14 which is carried in the plate 6 and has secured to it a lever 15 for mechanical operation of the brake. In addition a hydraulic cylinder 16 is secured to the plate 6 and carries a piston 17 of which the piston rod 18 engages the lower end of the lever 10. A flexible rubber boot 19 keeps dirt away from this mechanism.

It will be appreciated that rotation of the spindle 14 by movement of the upper end of operating lever 15 to the right, as indicated by the arrow in FIGURE 1, or the admission of hydraulic fluid under pressure to the cylinder 16, will move the pad 3 into frictional engagement with the disk 1 and at the same time the reaction at the upper end of the lever 10 is transmitted through the link 9 to the upper end of the pressure member 4 to urge the pad 2 into engagement with the other side of the disk.

To locate the pad 3 and to take the torque developed by its frictional engagement with the disk 1, this pad is carried on a pair of links 20 pivoted to the plate 6 at 21. It should be made clear however, that this pair of links 20 is only for locating and torque-taking purposes and does not form part of the linkage for bringing the pads into engagement with the disk. A spring 21*a* acting between the links 20 and the lever 10 retracts the pads on release of the brake.

The arrangement shown in FIGURES 3 and 4 operates on the same mechanical principles. Pads 22 and 23 engage the disk (not shown) from opposite sides. The pad 22 is secured to a pressure member 24 which is pivoted at 25 to a stationary torque-taking block 26, in the form of a casting or forging. In place of the pivoted link 9 of the earlier embodiment the upper end of the pressure member 24 has an integral cranked portion 27 which is connected directly by a knife-edge pivot 28 to the upper end of a pair of floating levers 29. The lower ends of the levers 29 carry between them a pin 30 received in notch in the lower ends of twin mechanical operating levers 31. The fulcrum about which this paired operating lever rocks is a pin 32 secured to one limb of it and engaging against a face of a stationary block formed by a casting or forging 33 which at the same time forms the housing of a hydraulic operating cylinder. The piston rod of this cylinder is not visible but it will be understood that it pushes on the lower ends of the levers 29.

The backing plate of the pad 23 is engaged by a snail cam 34 secured between the twin floating levers 29. An automatic adjusting device takes the form of a pin 35 on one limb of the operating levers 31, engaging a lug on a disk 36 which turns the snail cam to take up clearance when the angular movement of the levers 31 with respect to the levers 29 on mechanical operations of the brake exceeds a predetermined amount.

The brake assembly of FIGURES 3 and 4 is mounted on a torque-taking plate in the form of a disk 37 of sheet metal extending parallel to the plane of the rotatable disk (not shown). The block 26 and the block 33 are secured against opposite faces of the plate 37 by bolts passing through holes 38 (FIGURE 6). The general shape of the plate 37 is shown in FIGURES 5 and 6, which also shown how a notch 39 is provided for the portion 27 of the pressure member 24 to pass through. The pad 23 is located and guided in an opening 40 in the plate 37, and so a link corresponding to the link 20 of FIGURES 1 and 2 is not necessary. It will be seen that the edges of the opening are provided with generous flanges 41 (FIGURE 5) extending in the direction of movement of the pad. The opening is of roughly rectangular shape with its longer axis tangential to a circle about the axis of the disk but, as viewed in FIGURE 4, the general line of the levers 29 and 31 is inclined to this direction; this leads to a more compact arrangement than if the levers were also tangential.

FIGURES 7 and 8 show another variant. There is a sheet metal torque-taking plate 42 similar to the plate 37 of FIGURES 3 to 6, but of rather different shape. The edge of the plate has a deep flange 43 embracing the rotatable disk, which is not shown. A friction pad 44 engaging one side of the disk is carried on a pressure member 45 pivoted to a torque-taking block 46 and the other end of the member 45 is pivotally connected to the upper end of a pair of floating levers 47. An intermediate point in the pair of floating levers 47 engages the second friction pad (not shown) through an automatic adjusting device 49, and the lower ends of the levers 47 are engaged by a mechanical operating lever 50 and also by a piston rod 51 of a hydraulic cylinder 52. The operating lever 50 has in it an inclined slot 53 engaged by a pin 54 (FIGURE 8) actuating the automatic adjuster. Fulcra for the lever 50 are provided by bosses 55 on the cylinder 52.

The right-hand pad is guided in an opening in the plate 42, and the general direction of the levers 47 and 50 is parallel to the longer axis of the opening 43 in this case.

The block 46 is in the form of a plate of stout sheet metal with ears bent up from it to form trunnions for pivotal connection of the pressure member 45. It is secured to the plate 42 by screws 56 which pass through holes in the plate and are received in tapped holes in legs 57 formed integrally on the cylinder 52 so that these screws simultaneously secure the cylinder to the plate 42 as well. It will be apparent that in lieu of the integral curving-over part at the upper end of the arm 45 of FIGURE 7, a separate short link similar to the link 9 shown in FIGURE 1 could be readily employed.

It will be understood that the automatic adjusting device could be incorporated at any convenient point in the linkage, not necessarily the points shown in the embodiments above; there could be no provision for automatic adjustment at all.

I claim:

1. A disk brake comprising a rotatable disk, a stationary disk lying parallel to and co-axial with said rotatable disk adjacent one face of said rotatable disk, said stationary disk having therein an opening, a torque-taking block, a hydraulic cylinder, said block and cylinder being secured to opposite faces of said stationary disk with said block lying the same side as said rotatable disk, an arm pivoted at one of its ends to said block about an axis substantially parallel and adjacent to the plane of said rotatable disk, a first friction pad assembly rigidly secured to and wholly supported by said arm at an intermediate point in the length of said arm and adapted to engage the other face of said rotatable disk, a second friction pad assembly adapted to engage said one face of said rotatable disk, said second friction pad assembly being slidably guided and supported in the opening in said stationary disk to be movable in a direction substantially perpendicular to the plane of said rotatable disk, a floating lever, a tensile force-transmitting connection between one end of said lever and the other end of said arm, an intermediate point in the length of said lever having a rocking force-transmitting engagement with said second friction pad assembly, and a piston slidable in said cylinder in a direction substantially perpendicular to the plane of said rotatable disk, said piston having a force-transmitting engagement with the other end of said lever to urge said other end towards the rotatable disk.

2. A disk brake as set forth in claim 1, wherein said torque-taking block and said cylinder are clamped together by clamping means passing through said stationary disk and clamping said stationary disk between the block and cylinder.

3. A disk brake as set forth in claim 1 including a second lever, one end of said second lever having a force-transmitting engagement with the other end of said first-mentioned lever and said second lever having a rocking fulcrum engagement with said cylinder at an intermediate point in the length of said second lever adjacent said one end.

4. A disk brake as set forth in claim 1 wherein said stationary disk has a peripheral flange embracing said rotatable disk.

5. A disk brake comprising a rotatable disk, a stationary disk lying generally parallel to and co-axial with said rotatable disk and lying adjacent one face of said rotatable disk, said stationary disk having therein an opening, a torque-taking block, said block being secured to said stationary disk, an arm pivoted at one of its ends to said block about an axis substantially parallel and adjacent to the plane of said rotatable disk, a first friction pad assembly rigidly secured to and wholly supported by said arm at an intermediate point in the length of said arm and adapted to engage the other face of said rotatable disk, a second friction pad assembly adapted to engage said one face of said rotatable disk, said second friction pad assembly being slidably guided and supported in the opening in said stationary disk, a floating lever, a tensile force-transmitting connecion between one end of said lever and the other end of said arm, an intermediate point in the length of said lever having a rocking force-transmitting engagement with said second friction pad assembly, and force-applying means acting on the other end of said lever in a direction to urge that other end of the lever towards the plane of said rotatable disk.

6. A disk brake as set forth in claim 5 wherein said opening is rectangular, said second friction pad assembly is rectangular, and said floating lever extends along a line which, viewed along a line parallel to the axes of the disks, makes an acute angle with the longer sides of said opening.

7. A disk brake as set forth in claim 5 wherein said stationary disk has a second opening therein and wherein said tensile force-transmitting connection between said arm and lever extends through this second opening.

8. A disk brake as set forth in claim 5 wherein said force-applying means comprise a second lever acting on said other end of said floating lever.

9. A disk brake as set forth in claim 5 including an abutment member, said abutment member being secured to the opposite face of said stationary disk from said torque-taking block, and wherein said force-applying means comprise means acting between said abutment member and said other end of the lever.

10. A disk brake as set forth in claim 5 including an abutment member, said abutment member being clamped to the opposite face of said stationary disk from said torque-taking block by bolts passing through said stationary disk to clamp the latter between abutment member and said block, and wherein said force-applying means comprise means acting between said abutment member and said other end of the lever.

11. A disk brake as set forth in claim 5 including an abutment member, said abutment member being clamped to the opposite face of said stationary disk from said torque-taking block, and wherein said force-applying means comprise a second lever having one end thereof engaging said other end of said floating lever and having an intermediate point thereof reacting against said abutment member.

12. A disk brake as set forth in claim 5 including an abutment member, said abutment member being clamped to the opposite face of said stationary disk from said torque-taking block, and a cylinder in said abutment member, said force-applying means comprising a piston slidable in said cylinder in a direction perpendicular to the plane of said rotatable disk.

13. A disk brake as set forth in claim 5, including an abutment member, said abutment member being clamped to the opposite face of said stationary disk from said torque-taking block, and wherein said force-applying means comprise a second lever acting between said abutment member and said other end of said floating lever, and including further force-applying means comprising a hydraulic piston and cylinder acting between said abutment member and said other end of said floating lever.

14. A disk brake as set forth in claim 5 wherein said force-applying means comprise a second lever acting on said other end of said floating lever and including automatic adjuster means between said floating lever and said second friction pad assembly and an operative connection between said adjuster means and said second lever whereby said adjuster means are operated by angular movement of said second lever beyond a predetermined amount.

No references cited.

MILTON BUCHLER, *Primary Examiner.*

G. E. A. HALVOSA, *Assistant Examiner.*